UNITED STATES PATENT OFFICE.

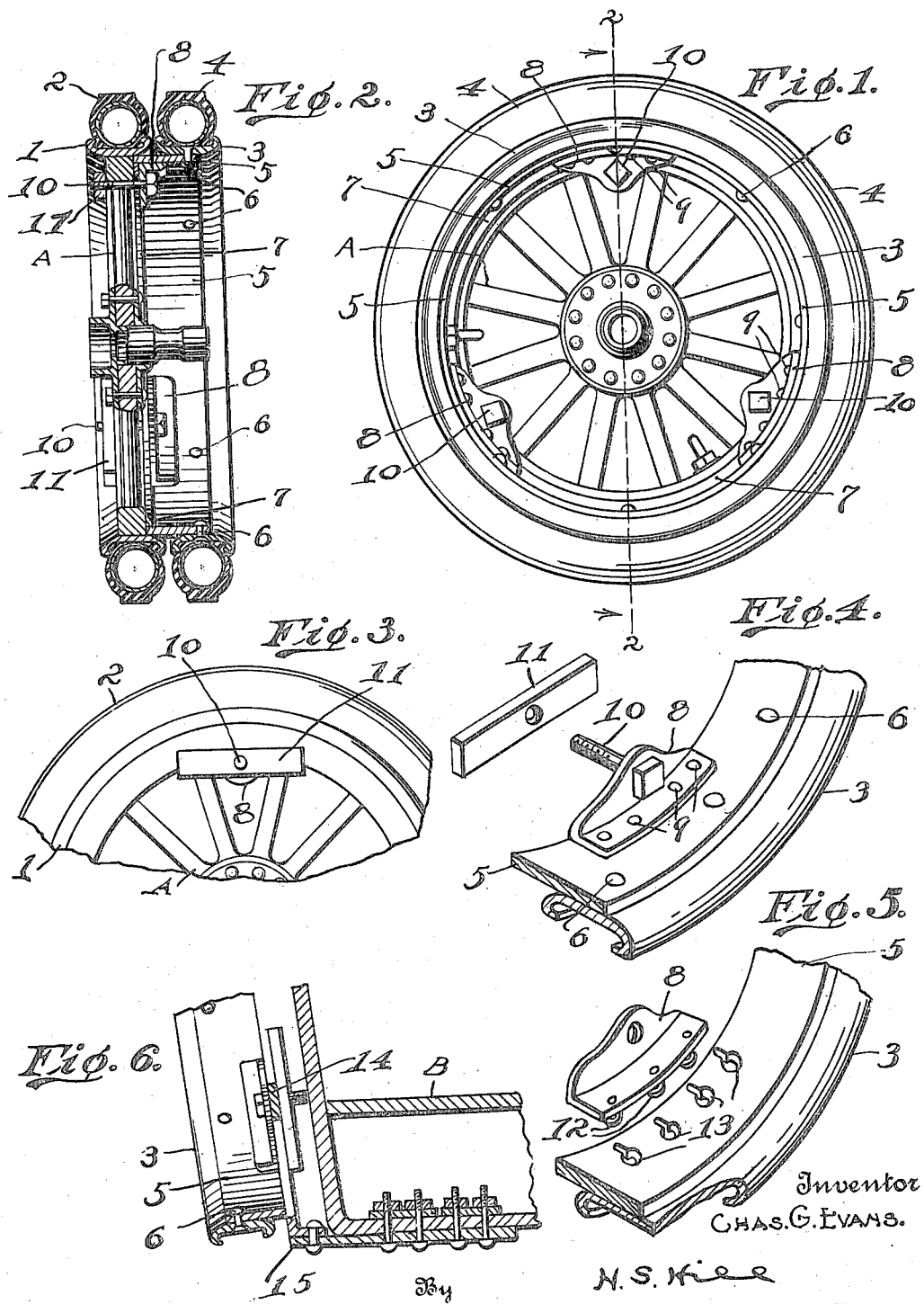

CHARLES GEORGE EVANS, OF SAULT STE. MARIE, ONTARIO, CANADA.

SUPPLEMENTAL WHEEL-RIM ATTACHMENT.

1,294,887.

Specification of Letters Patent. Patented Feb. 18, 1919.

Application filed November 21, 1918. Serial No. 263,564.

*To all whom it may concern:*

Be it known that I, CHARLES GEORGE EVANS, a subject of the King of Great Britain, residing at Sault Ste. Marie, in the Province of Ontario, Dominion of Canada, have invented a new and useful Supplemental Wheel-Rim Attachment; and I do hereby declare the following to be a full, clear, and exact description of the invention, such as will enable others skilled in the art to which it appertains to make and use the same.

The present invention relates to a supplemental rim attachment for the wheels of motor vehicles and the like, and has for its object to provide a device of this character which embodies novel features of construction whereby in the event of a blow out or puncture a supplemental rim provided with an outer inflated tire can be readily clamped in position upon the wheel, thereby enabling the driver of the vehicle to proceed without the delay which would be incident to removing and replacing the flat tire.

Further objects of the invention are to provide a device of this character which is comparatively simple and inexpensive in its construction, which can be readily used in connection with the conventional artillery wheels, which is so constructed as to obtain a solid support around the entire periphery of the supplemental rim when the latter is in position, and which can be placed in position or removed therefrom without delay or loss of time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a conventional artillery wheel having the supplemental rim attachment applied thereto.

Fig. 2 is a transverse sectional view on the line 2—2 of Fig. 1.

Fig. 3 is a rear elevation of the upper portion of the wheel with the attachment applied thereto.

Fig. 4 is a detail perspective view of a portion of the supplemental rim and one of the clamping bolts for securing it in position.

Fig. 5 is a similar view showing a slight modification in which the clamping brackets are detachably and adjustably secured to the rim.

Fig. 6 is a detail sectional view showing a bracket for supporting the supplemental rim at the back of the vehicle body when not in use.

Corresponding and like parts are referred to in the following description and indicated in all the views of the drawings by the same reference characters.

Referring to the drawings, which illustrate one embodiment of the invention, the reference character A designates an artillery wheel which is of the conventional construction, being provided with a channel rim 1 which projects laterally upon opposite sides of the felly of the wheel and engages the main tire 2. This is all of the usual construction and no claim as to novelty is based thereon. The supplemental rim 3 has a channel shaped formation and carries an auxiliary tire which is fully inflated and is intended to be used when the main tire is deflated by a puncture or blow out. A stiff metal band 5 extends around the interior of the supplemental rim 3 and is rigidly secured thereto by rivets 6 or other suitable fastening members. This metal band 5 projects laterally from one side of the supplemental rim 3 and the projecting edge thereof is adapted to be fitted against the felly of the wheel A and held in engagement with the overhanging portion of the channel rim 1, thereby obtaining an annular support from the overhanging portion of the rim which tends to stiffen the band and prevent bending or distortion thereof when in use. If desired, a ring 7 may be secured to the outer face of the felly of the wheel so as to provide an annular seat between the said ring and the overhanging portion of the channel rim 1 for the reception of the projecting edge of the metal band 5. With the edge of the metal band received within this annular seat it will be obvious that the band will be firmly held against bending or distortion and that a stiff support will thereby be provided for the supplemental rim 3 so that the latter can readily carry any load which may be imposed thereon.

A series of angle iron brackets 8 project inwardly from the metal band 5 at suitable intervals around the periphery thereof, said brackets being held in position by suitable fastening members 9, and the inwardly projecting flanges thereof being formed with openings which receive the clamping bolts 10. These clamping bolts are designed to engage bars 11 which are of a sufficient length to straddle the distance between a pair of the wheel spokes. These bars 11 are applied to the back of the wheel and suitably engaged with the felly and spokes thereof, as indicated by Fig. 3. With this construction it will be obvious that when the clamping bolts 10 are tightened the supplemental rim will be firmly held in position upon the wheel as indicated by Figs. 1 and 2. The load of the vehicle will then be supported upon the supplemental tire 4 so that the driver can proceed without the necessity of removing the flat tire on the main rim 1 of the wheel. If desired, the angle iron brackets 8 may be detachably secured to the metal band 5 and arranged so that they can have a limited peripheral adjustment to accommodate the fastening means to the spokes of the wheel. In this figure the bracket 8 is shown as provided with a series of headed studs 12 which are adapted to detachably engage and interlock with key hole slots 13 in the band. The heads of the studs are of such a size as to pass freely through the large ends of the key hole slots, although when the bracket is shifted laterally into operative position the shanks of the studs enter the contracting ends of the key hole slots. A sufficient number of the key hole slots is provided to admit of a slight peripheral adjustment of the brackets on the band, thereby enabling the brackets to be readily arranged in a proper manner with respect to the spokes of the wheel. There will thus be no difficulty in applying the attachment to any wheel which may be encountered by ordinary practice. For supporting the auxiliary rim at the back of the vehicle when not in use, any suitable arrangement such as that shown by Fig. 6 may be employed. In this figure a horizontal bar 14 extends across the rear end of the body of the vehicle, being rigidly supported by a bracket 15. A fragmentary portion of the vehicle body is indicated at B. The clamping bolts 10 pass through openings in the horizontal bar and the bars 11 are applied to the threaded ends thereof. The supplemental rim, of course, is so arranged that a pair of the brackets 8 on opposite sides of the rim fit against the ends of the bar 14, and only two of the clamping bolts are used. The supplemental rim is thus held firmly in position when not in use, although it can be readily removed from the bracket and applied to one of the wheels of the vehicle when needed.

Having thus described the invention what I claim as new and desire to secure by Letters Patent, is:—

1. The combination with a wheel and a main rim mounted upon and overhanging the felly of the wheel, an auxiliary rim arranged at one side of the main rim, a ring applied to one side of the wheel felly in a spaced relation to the overhanging portion of the main rim and providing an annular seat, a band secured to the interior of the auxiliary rim and projecting laterally upon one side thereof, said projecting edge of the band being fitted in the annular seat between the ring and main rim and obtaining a peripheral bearing upon the main rim so as to be supported on all sides, and means for clamping the auxiliary rim and band in position.

2. The combination with a wheel and a main rim mounted upon and overhanging the felly of the wheel, a ring applied to one side of the wheel felly in a spaced relation to the overhanging portion of the rim and coöperating therewith to form an annular seat, an auxiliary rim arranged at one side of the main rim, a band secured to the interior of the auxiliary rim and projecting laterally on one side thereof, said laterally projecting edge of the band being received within the before-mentioned annular seat and bearing peripherally against the main rim so as to be supported on all sides, flanges projecting inwardly from the band at intervals, clamping bolts extending through the flanges, and clamping bars engaging the opposite side of the wheel and having a threaded connection with the clamping bolts.

3. The combination with a wheel and a main rim mounted upon and overhanging the felly of the wheel, an auxiliary rim arranged at one side of the main rim, a band secured to the interior of the auxiliary rim and projecting laterally on one side thereof, said projecting edge of the band being seated against the felly and peripherally engaging the overhanging edge of the main rim so as to obtain a bearing on all sides, angle iron brackets detachably and adjustably applied to the band on the interior thereof, clamping bolts carried by the brackets and extending through the spaces between the spokes of the wheel, and clamping bars applied to the opposite side of the wheel and having a threaded engagement with the clamping bolts.

4. The combination with a wheel and a main rim mounted upon and overhanging the felly of the wheel, an auxiliary rim arranged at one side of the main rim, a band secured to the interior of the auxiliary rim and projecting laterally on one side thereof, the laterally projecting edge of the band being seated against the wheel felly and engaging the overhanging edge of the main rim, and said band being formed at intervals with a number or series of key hole slots, angle iron brackets provided with headed studs having a detachable and interlocking connection with the key hole slots, clamping bolts carried by the brackets and extending through the spaces between the wheel spokes, and clamping bars applied to the opposite side of the wheel and having a threaded engagement with the clamping bolts.

In testimony whereof I have signed my name to this specification in the presence of two subscribing witnesses.

CHARLES GEORGE EVANS.

Witnesses:
 JOHN C. MACLEAN,
 W. A. ATKIN.